(12) United States Patent
Yoo

(10) Patent No.: US 8,581,877 B2
(45) Date of Patent: Nov. 12, 2013

(54) MOBILE TERMINAL AND OPERATION CONTROL METHOD THEREOF

(75) Inventor: Young Jin Yoo, Seoul (KR)

(73) Assignee: LG Electronics Inc., Seoul (KR)

(*) Notice: Subject to any disclaimer, the term of this patent is extended or adjusted under 35 U.S.C. 154(b) by 1144 days.

(21) Appl. No.: 12/493,822

(22) Filed: Jun. 29, 2009

(65) Prior Publication Data

US 2010/0001967 A1   Jan. 7, 2010

(30) Foreign Application Priority Data

Jul. 7, 2008   (KR) .................. 10-2008-0065469

(51) Int. Cl.
*G06F 3/045*   (2006.01)

(52) U.S. Cl.
USPC ............................ 345/174; 345/173; 345/175

(58) Field of Classification Search
USPC .................. 345/173–179; 178/18.01–18.09, 178/20.01–20.04
See application file for complete search history.

(56) References Cited

U.S. PATENT DOCUMENTS

| | | | |
|---|---|---|---|
| 8,311,514 B2 * | 11/2012 | Bandyopadhyay et al. | 455/410 |
| 8,331,992 B2 * | 12/2012 | Stallings et al. | 455/566 |
| 8,458,485 B2 * | 6/2013 | Bandyopadhyay et al. | 713/184 |
| 2004/0085351 A1 | 5/2004 | Tokkonen | |
| 2005/0079896 A1 | 4/2005 | Kokko et al. | |
| 2006/0012577 A1 | 1/2006 | Kyrola | |
| 2006/0189345 A1 | 8/2006 | Suzuki et al. | |
| 2007/0150842 A1 | 6/2007 | Chaudhri et al. | |
| 2008/0055276 A1 | 3/2008 | Chang | |
| 2009/0061837 A1 | 3/2009 | Chaudhri et al. | |
| 2010/0159995 A1 | 6/2010 | Stallings et al. | |
| 2010/0306705 A1 | 12/2010 | Nilsson | |
| 2010/0306718 A1 | 12/2010 | Shim et al. | |
| 2012/0009896 A1 | 1/2012 | Bandyopadhyay et al. | |
| 2012/0129496 A1 | 5/2012 | Park et al. | |

FOREIGN PATENT DOCUMENTS

| | | |
|---|---|---|
| EP | 1 694 040 A2 | 8/2006 |
| JP | 2006-229730 A | 8/2006 |
| WO | WO 2004/001560 A1 | 12/2003 |
| WO | WO 2008/030976 A2 | 3/2008 |

* cited by examiner

*Primary Examiner* — Vijay Shankar
(74) *Attorney, Agent, or Firm* — Birch, Stewart, Kolasch & Birch, LLP

(57) ABSTRACT

A method of controlling a mobile terminal, and which includes entering into a touch-lock mode to lock an entire display area on a touch screen, receiving an unlock signal corresponding to a selection of a touch-lock release button on the terminal, and unlocking an area of the touch screen that includes at least one displayed icon when the unlock signal is received such that a touching of the at least one icon displayed on the touch screen executes a corresponding function of the icon, and maintaining other areas of the touch screen in the touch-lock mode.

12 Claims, 13 Drawing Sheets

(a)            (b)

(a)          (b)          (c)

MOBILE TERMINAL AND OPERATION CONTROL METHOD THEREOF

CROSS-REFERENCE TO RELATED APPLICATION

This application claims the benefit of Korean Application No. 2008-65469, filed Jul. 7, 2008 in the Korean Intellectual Property Office, the disclosure of which is incorporated herein by reference in its entirety.

BACKGROUND OF THE INVENTION

1. Field of the Invention

The present invention relates to a mobile terminal and corresponding method for selecting an icon and executing an application corresponding to the icon displayed on a touch-locked touch screen.

2. Description of Related Art

Mobile terminals are portable devices, which can provide users with various services such as a voice calling service, a video calling service, an information input/output service, and a data storage service. Many terminals also allow users to capture photos or moving pictures, play music files or moving image files, play game programs, and receive broadcast programs. Thus, mobile terminals now function as multimedia players. However, the input selection methods provided with the mobile terminals are restricted and limited in nature, which inconveniences the user.

SUMMARY OF THE INVENTION

Accordingly, one object of the present invention is to address the above-noted and other problems.

Another object of the present invention is to allow a user to select particular icons and execute applications corresponding to the icons on a touch screen touch-lock mode.

To achieve these and other advantages and in accordance with the purpose of the present invention, as embodied and broadly described herein, the present invention provides in one aspect a method of controlling a mobile terminal, and which includes entering into a touch-lock mode to lock an entire display area on a touch screen, receiving an unlock signal corresponding to a selection of a touch-lock release button on the terminal, and unlocking an area of the touch screen that includes at least one displayed icon when the unlock signal is received such that a touching of the at least one icon displayed on the touch screen executes the corresponding function of the icon, and maintaining other areas of the touch screen in the touch-lock mode.

In another aspect, the present invention provides a mobile terminal including a touch screen, a touch-lock release button, and a controller configured to enter into a touch-look mode to lock an entire display area on the touch screen upon receiving an unlock signal corresponding to a selection of the touch-lock release button, and to unlock an area of the touch screen that includes at least one displayed icon when the unlock signal is received such that a touching of the at least one icon displayed on the touch screen executes the corresponding function of the icon, and maintaining other areas of the touch screen in the touch-lock mode.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The present invention will hereinafter be described in detail with reference to the accompanying drawings in which exemplary embodiments of the invention are shown. In addition, the term 'mobile terminal' in the following description refers to a mobile phone, a smart phone, a laptop book computer, a digital broadcast receiver, a personal digital assistant (PDA), a portable multimedia player (PMP), a navigation device, etc.

Figure 1:
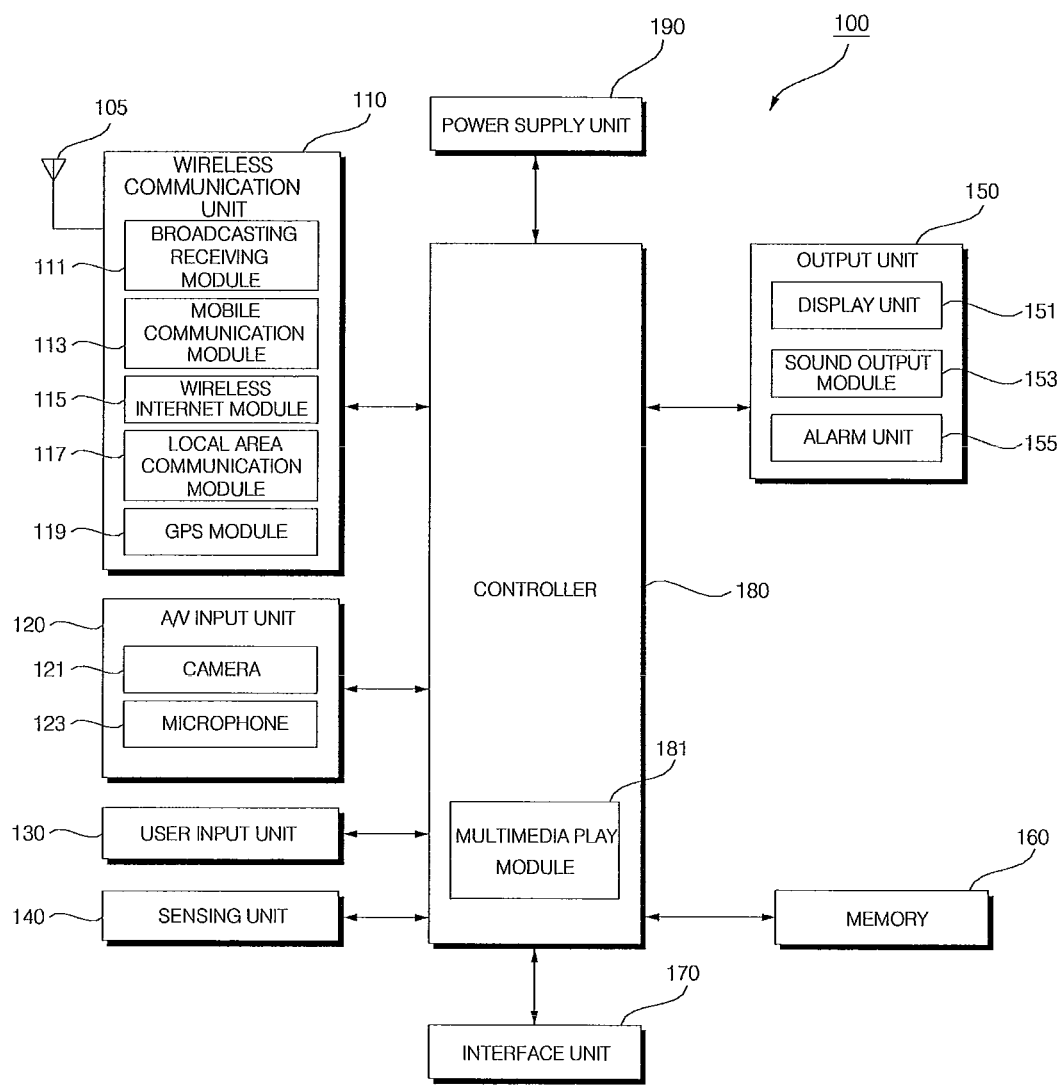
FIG. 1 is a block diagram of a mobile terminal according to an embodiment of the present invention.

FIG. 1 is a block diagram illustrating a mobile terminal 100 according to an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a control unit 180, and a power supply unit 190. Two or more of the wireless communication unit 110, the A/V input unit 120, the user input unit 130, the sensing unit 140, the output unit 150, the memory 160, the interface unit 170, the control unit 180, and the power supply unit 190 may be incorporated into a single unit, or some of the units may be divided into two or more smaller units.

In addition, in FIG. 1, the wireless communication unit 110 includes a broadcast reception module 111, a mobile communication module 113, a wireless Internet module 115, a short-range communication module 117, and a global positioning system (GPS) module 119. The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this instance, the broadcast-related information may be received by the mobile communication module 113, rather than by the broadcast reception module 111. The broadcast-related information may come in various forms, for example, an electronic program guide (EPG) of the digital multimedia broadcasting (DMB) system or an electronic service guide (ESG) of the digital video broadcast-handheld (DVB-H) system.

Further, the broadcast reception module 111 may receive the broadcast signal using various broadcasting systems such as the digital multimedia broadcasting-terrestrial (DMB-T) system, the digital multimedia broadcasting-satellite (DMB-S) system, the media forward link only (MediaFLO) system, the DVB-H system, and the integrated services digital broadcast-terrestrial (ISDB-T) system. In addition, the broadcast reception module 111 may be configured to be suitable for nearly all types of broadcasting systems other than those set forth herein. The broadcast signal and/or the broadcast-related information received by the broadcast reception module 111 may also be stored in the memory 160. In addition, the mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

Further, the wireless Internet module 115 is a module for wirelessly accessing the Internet, and may be embedded in the mobile terminal 100 or be installed in an external device. Also, the short-range communication module 117 is a module for short-range communication, and may use various short-range communication techniques such as Bluetooth, radio frequency identification (RFID), infrared data association (IrDA), ultra wideband (UWB), and ZigBee.

In addition, the GPS module 119 receives position information from a plurality of GPS satellites, and the A/V input unit 120 is used to receive audio signals or video signals. In FIG. 1, the A/V input unit 120 includes a camera module 121 and a microphone module 123. The camera module 121 processes various image frames such as still images or moving images captured by an image sensor during a video call mode or an image capturing mode. The image frames processed by the camera module 121 may be displayed by a display module 151 included in the output unit 150. Further, the image frames processed by the camera module 121 may be stored in the memory 160 or may be transmitted outside the mobile terminal 100 through the wireless communication unit 110. The mobile terminal 100 may also include two or more camera modules 121.

In addition, the microphone module 123 receives external sound signals during a call mode, a recording mode, or a voice recognition mode with the use of a microphone and converts the sound signals into electrical sound data. In the call mode, the mobile communication module 113 converts the electrical sound data into data that can be readily transmitted to a mobile communication base station and then outputs the data obtained by the conversion. The microphone module 123 may also use various noise removal algorithms to remove noise that may be generated during the reception of external sound signals. Further, the user input unit 130 generates key input data based on user input for controlling the operation of the mobile terminal 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

In addition, the sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slide-type mobile phone, the sensing unit 140 can determine whether the mobile terminal 100 is opened or closed. In addition, the sensing unit 140 can determine whether the mobile terminal 100 is powered by the power supply unit 190 and whether the interface unit 170 is connected to an external device. In FIG. 1, the sensing unit 140 also includes a proximity sensor 141 that determines whether there is an entity nearby and approaching the mobile terminal 100 without any mechanical contact with the entity. More specifically, the proximity sensor 141 can detect an entity that is nearby and approaching by detecting a change in an alternating magnetic field or the rate of change of static capacitance. The sensing unit 140 may also include two or more proximity sensors 141.

Also, the output unit 150 may output audio signals, video signals and alarm signals. The output unit 150 in FIG. 1 includes the display module 151, a sound output module 153, an alarm module 155, and a haptic module 157. The display module 151 displays various information processed by the mobile terminal 100. For example, if the mobile terminal 100 is in a call mode, the display module 151 can display a user interface (UI) or a graphic user interface (GUI) for making or receiving a call. If the mobile terminal 100 is in a video call mode or an image capturing mode, the display module 151 can display a ULI or a GUI for capturing or receiving images.

As described above, if the display module 151 and the user input unit 130 form a mutual layer structure and are thus implemented as a touch screen, the display module 151 may be used not only as an output device but also as an input device. The display module 151 may include at least one of a liquid crystal display (LCD), a thin film transistor (TFT)-LCD, an organic light-emitting diode (OLED), a flexible display, and a three-dimensional (3D) display. The mobile terminal 100 may also include two or more display modules 151. For example, the mobile terminal 100 may include an external display module and an internal display module.

Further, the sound output module 153 may output audio data received by the wireless communication unit 110 during a call reception mode, a call mode, a recording mode, a voice recognition mode, or a broadcast reception mode or may output audio data present in the memory 160. In addition, the sound output module 153 may output various sound signals associated with the functions of the mobile terminal 100 such as receiving a call or a message. The sound output module 153 may also include a speaker and a buzzer. In addition, the alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. The alarm module 155 may also output a signal upon receiving a call signal or a message. In addition, the alarm module 155 may receive a key signal and may output a signal as feedback to the key signal. Thus, once a signal is output by the alarm module 155, the user can recognize that an event has occurred. A signal for notifying the user of the occurrence of an event may also be output by the display module 151 or the sound output module 153.

In addition, the haptic module 157 can provide various haptic effects (such as vibration) that can be perceived by the user. If the haptic module 157 generates vibration as a haptic effect, the intensity and the pattern of vibration generated by the haptic module 157 may be altered in various manners. The haptic module 157 can also synthesize different vibration effects and output the result of the synthesization. Alternatively, the haptic module 157 can sequentially output different vibration effects. Further, the haptic module 157 can provide various haptic effects, other than vibration, by using a pin array that moves perpendicularly to a contact skin surface, by injecting or sucking in air through an injection hole or a suction hole, by stimulating the surface of the skin, by contacting an electrode, by using an electrostatic force, or by realizing the sense of heat or cold using a device capable of absorbing heat or generating heat. The haptic module 157 can also be configured to enable the user to recognize a haptic effect using the kinesthetic sense of the fingers or the arms. The mobile terminal 100 may also include two or more haptic modules 157.

Further, the memory 160 stores various programs for the operation of the control unit 180. In addition, the memory 160 temporarily stores various data such as a phonebook, messages, still images, or moving images. The memory 160 may also include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may also operate a web storage, which performs the functions of the memory 160 on the Internet.

In addition, the interface unit 170 can interface with an external device that can be connected to the mobile terminal 100. The interface unit 170 may be a wired/wireless headset, an external battery charger, a wired/wireless data port, a card socket for, for example, a memory card) or a subscriber identification module (SIM)/user identity module (UIM) card, an audio input/output (I/O) terminal, a video I/O terminal, or an earphone. The interface unit 170 can also receive data from an external device or be powered by an external device. The interface unit 170 can transmit data provided by an external device to other components in the mobile terminal 100 or transmit data provided by other components in the mobile terminal 100 to an external device.

In addition, the control unit 180 controls the overall operations of the mobile terminal 100. For example, the control unit 180 performs various control operations regarding making/receiving a voice call, transmitting/receiving data, or making/receiving a video call. In FIG. 1, the control unit 180 includes a multimedia play module 181, which plays multimedia data. The multimedia play module 181 may be implemented as a hardware device and may be installed in the control unit 180. Alternatively, the multimedia play module 181 may be implemented as a software program. Further, the power supply unit 190 is supplied with power by an external power source or an internal power source and supplies power to other components in the mobile terminal 100. The mobile terminal 100 may include a wired/wireless communication system and a satellite-based communication system, and may be configured to be able to operate in a communication system transmitting data as frames or packets.

Next, the exterior of the mobile terminal 100 will be described with reference to FIGS. 2 and 3. In the following description, the mobile terminal 100 is a bar-type mobile phone with a touch screen on its front surface. However, the embodiments of the present invention can be applied to any type of phone with a touch screen.

Figure 2:
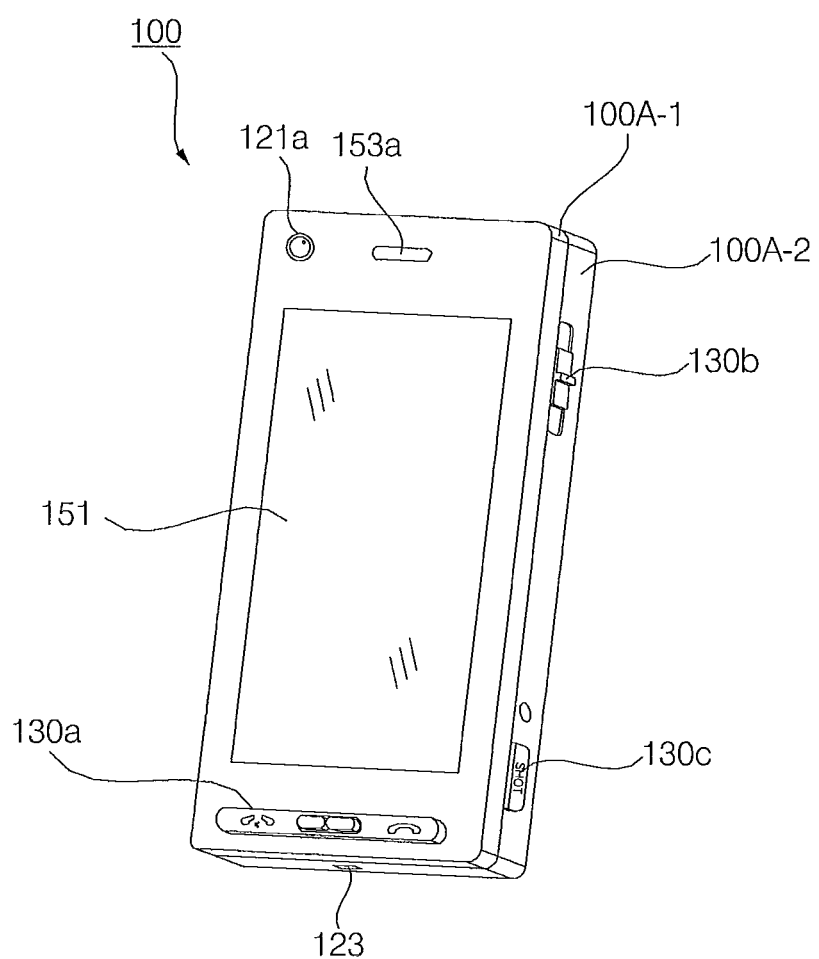
FIG. 2 is a front perspective view of the mobile terminal illustrated in FIG. 1.

FIG. 2 is a front perspective view of the mobile terminal 100 shown in FIG. 1. Referring to FIG. 2, the mobile terminal 100 includes a front case 100A-1 and a rear case 100A-2, which form the exterior of the first body 100A. Various electronic products are also installed in the space between the front case 100A-1 and the rear case 100A-2. At least one intermediate case may also be disposed between the front case 100A-1 and the rear case 100A-2. Further, the front case 100A-1 and the rear case 100A-2 may be formed of a synthetic resin through injection molding, or be formed of a metal such as stainless steel (STS) or titanium (Ti).

The display unit 151 (hereinafter referred to as display 151), a first sound output module 153a, a first camera 121a, and a first user input unit 130a are disposed in the first body, and particularly, in the front case 100A-1. A second user input unit 130b, a third user input unit 130c, and the microphone 123 are disposed on a lateral side of the rear case 100A-2.

Also, as discussed above, the display 151 may include an LCD or an OLED, which visually represents information. Since a touch pad is configured to overlap the display 151 and thus to realize a layered structure, the display 151 can function as a touch screen. Thus, it is possible for a user to input information to the display 151 simply by touching the display 151. Further, the first sound output module 153a may be implemented as a receiver or a speaker and the first camera 121a is configured to capture a still image or a moving image of a user. The microphone 123 also receives the voice of a user and other sounds.

Also, the first through third user input unit 130a-130c may be collectively referred to as the user input unit 130. The user input unit 130 may also adopt various manipulation methods and offer tactile feedback to a user. For example, the user input unit 130 may be implemented as a dome switch or a touch pad which receives a command or information upon being pushed or touched by a user. Alternatively, the user input unit 130 may be implemented as a wheel, a jog dial, or a joystick. The first user input unit 130a can allow a user to input such commands as 'start', 'end', and 'scroll', the second input unit 130-b can allow a user to input numbers, characters or symbols, and the third input unit 130-c can serve as a hot key for activating certain functions of the mobile terminal 100.

Figure 3:
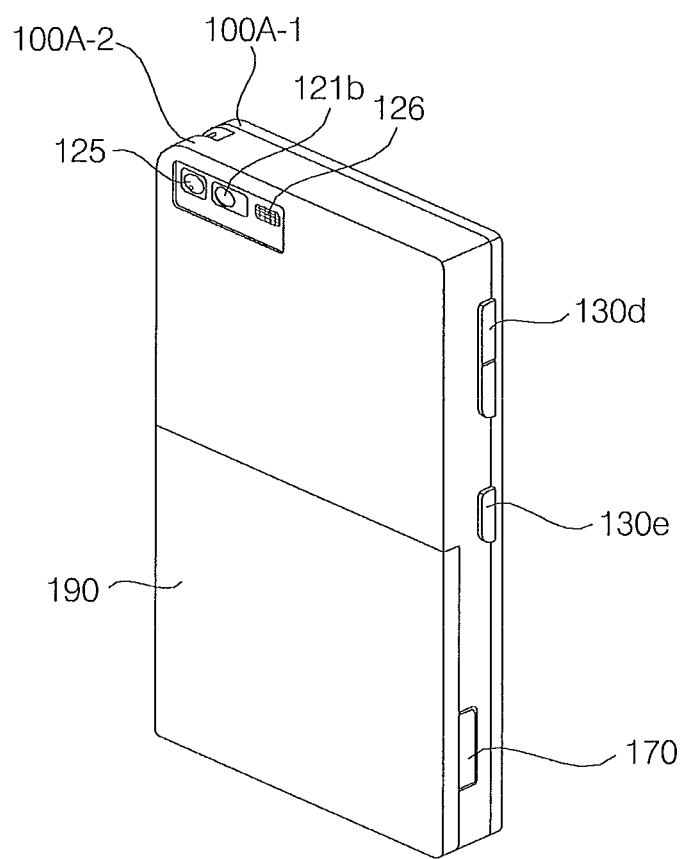
FIG. 3 is a rear perspective view of the mobile terminal illustrated in FIG. 2.

Next, FIG. 3 is a rear perspective view of the mobile terminal 100 shown in FIG. 2. Referring to FIG. 3, a fourth user input unit 130d, a fifth user input unit 130e, and the interface unit 170 are disposed on a lateral side of the rear case 100A-2. A second camera 121b is also disposed at the rear of the rear case 100A-2. Further, the second camera 121b may have a different photographing direction from that of the first camera 121a shown in FIG. 2. In addition, the number of pixels of the second camera 121b may be different from the number of pixels of the first camera 121a. For example, the first camera 121a may be used to capture an image of the face of a user and then transmit the captured image during a video call. Thus, a low-pixel camera may be used as the first camera module 121*a*. The second camera 121*b* may be used to capture an image of an ordinary subject. Given that images captured by the second camera 121*b* generally do not need to be transmitted, a high-pixel camera module may be used as the second camera 121*b*.

Also, a mirror 125 and a camera flash 126 are disposed near the second camera 121*b*. A user can then look in the mirror 125 when capturing an image of himself/herself with the second camera 121*b*. Further, the camera flash 126 illuminates a subject when the second camera 121*b* captures an image of the subject. A second sound output module may be also be provided in the rear case 100A-2, and thus realize a stereo function together with the first sound output module 153*a* shown in FIG. 2. The second sound output module may also be used in a speaker phone mode.

In addition, an antenna for receiving a broadcast signal may be provided on one side of the rear case 100A-2, and be retracted from the rear case 100A-2. The interface unit 170 also serves as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying power to the mobile terminal 100. The interface unit 170 may also be a user authentication module such as a SIM or a UTM or may be a card socket for an exterior-type card such as a memory card for storing data.

Further, the power supply unit 190 may be inserted in the rear case 100A-2. The power supply unit 190 may be a rechargeable battery and be coupled to the rear case 100A-2 so as to be able to be attached to or detached from the rear case 100A-2. The second camera 121*b* is also illustrated in FIG. 3 as being disposed on the second body 100B, but the present invention is not restricted to this. In addition, the first camera 121*a* may be able to rotate and thus to cover the photographing direction of the second camera 121*a*. In this instance, the second camera module 121*b* may be optional.

Figure 4:
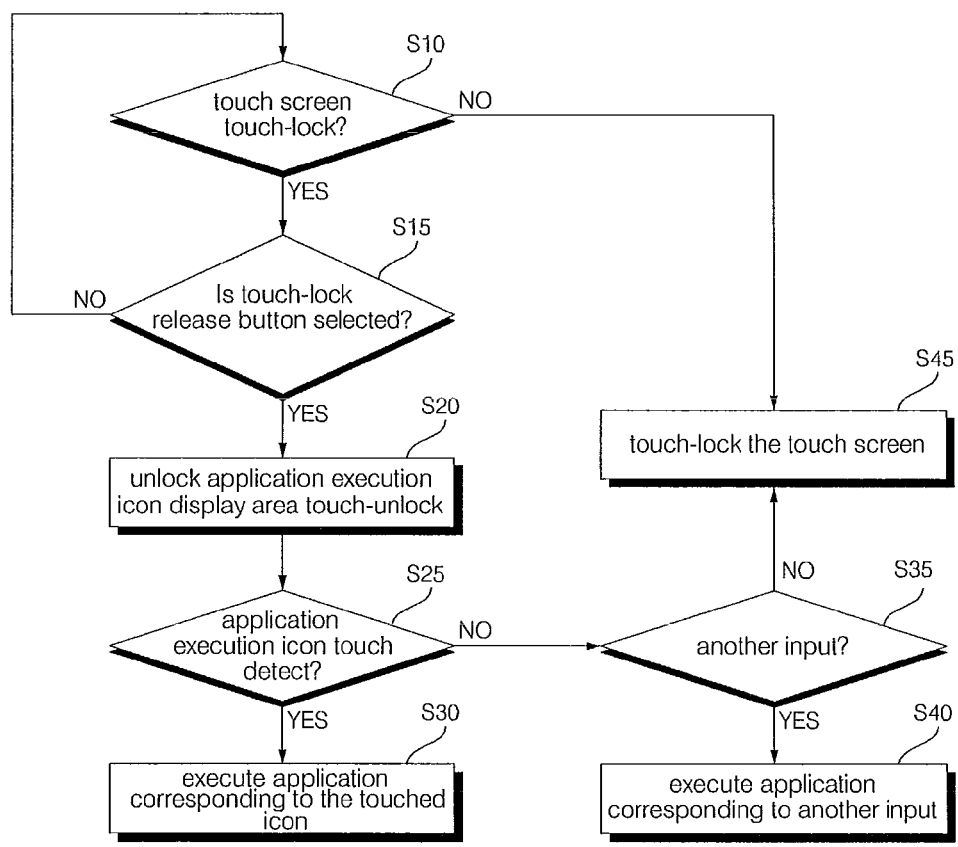
FIG. 4 is a flowchart illustrating a method of controlling a mobile terminal according to an embodiment of the present invention.

Next, FIG. 4 is a flowchart illustrating a method of controlling a mobile terminal according to a first embodiment of the present invention. As shown in FIG. 4, the controller 180 determines whether the touch screen is locked (i.e., the touch screen is in a touch-locked mode) (S10). The touch-lock mode corresponds to the situation when the controller 180 locks the touch screen if no user input is detected for a predetermined time. The controller 180 can also lock the touch screen when a user presses a predetermined button (e.g., for an amount of time longer than a predetermined time, by double touching the predetermined button, etc).

In addition, when the controller 180 locks the touch screen, the user can not activate any applications or icons displayed on the touch screen when touching the touch screen (i.e., because the touch screen is locked). The touch-lock mode is also used to conserve battery power by displaying only a touch-lock mode predetermined screen, for example. When the mobile terminal is not in a touch-lock mode, the user can touch keys, icons, etc. displayed on the touch screen. For example, the user can touch a phone icon and then touch particular keys to enter a desired phone number.

Further, when the mobile terminal enters the touch-lock mode, the controller 180 displays one or more icons corresponding to different applications. For example, the controller 180 can display a phone icon, a message icon, a camera icon, a music playing icon, etc. The user of the mobile terminal can also advantageously set what icons the controller 180 is to display when entering the touch-lock mode.

In addition, the touch-lock mode is maintained until the user selects a particular touch-lock release button. In more detail, if the controller 180 determines the mobile terminal is in the touch-lock mode (Yes in S10), the controller 180 then determines if the user has selected a touch-lock release button (S15). In one embodiment, the touch-lock release button is a mechanical button on a side of the terminal (e.g., because the entire display area is locked, the present invention advantageously provides a separate mechanically operated button that can be activated by pushing the button).

Further, when the controller 180 determines that the touch-lock release button has been selected (Yes in S15), the controller 180 unlocks an area of the touch screen that includes at least one displayed icon such that a touching of the at least one icon displayed on the touch screen executes the corresponding function of the icon, and maintains other areas of the touch screen in the touch-lock mode (S20). Also, the controller 180 can change at least one of a sharpness, a color, or a shape of the icon or icons, the image(s) displayed on an area adjacent to the area where the icon or icons are displayed, or the area adjacent to the area where the icon or icons are displayed, after the area is unlocked or released from the touch-lock mode. Thus, the user can easily see icons are unlocked, even though the other portions of the touch screen are still locked.

Then, as shown in FIG. 4, controller 180 determines whether the user touches one of the icons (S25). When the controller 180 determines the user has touched one of the unlocked icons (Yes in S25), the controller 180 executes the appropriate application corresponding to the touched icon (S30). Therefore, the user can execute an application without touch-unlocking the entire area on a touch-screen.

Further, if the touch screen is not in the touch-lock mode (No in S10), the controller 180 places the touch screen in the touch-lock mode if there hasn't been any input on the terminal for a predetermined amount of time, based on the user manipulating a preset key, etc. (S45). Also, if the controller 180 determines that the user has not touched an icon after the area including the icons has been unlocked (No in S25), the controller determines if the user has performed another input operation (S35). If the user has performed another input operation (Yes in S35), the controller 180 executes an application related to the other input operation (S40).

The other input operation can be another operation for unlocking the entire display area on the touch screen, in which instance the controller 180 unlocks the entire display area on the touch screen. The other input operation can also be an input via a key on the mobile terminal, in which instance the controller 180 controls the mobile terminal according to the key input. Also, when a predetermined time elapse after the area where the icons are displayed is unlocked, and there is no input on the touch screen or the keys on the mobile terminal (No in S35), the controller 180 re-enters into the touch-lock mode such that the entire display area is again locked (S45).

Figure 5:
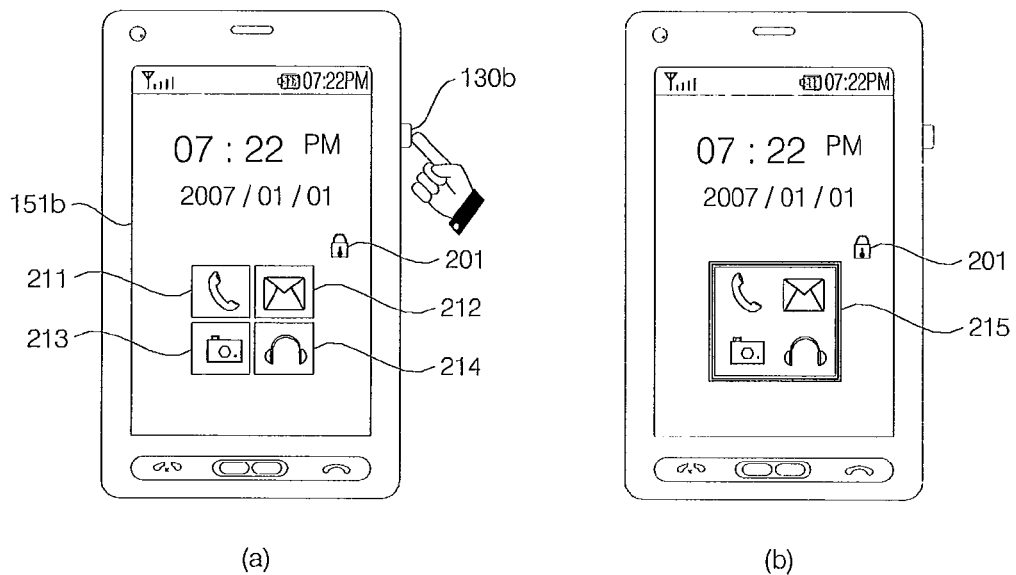
FIGS. 5-8 are overviews of display screens illustrating features related to the embodiment shown in FIG. 4.
Figure 6:
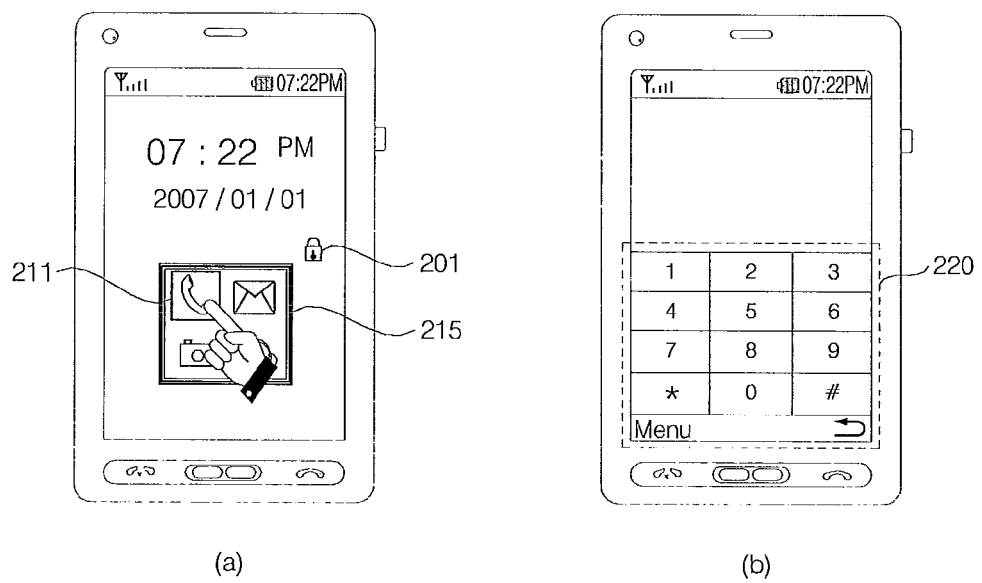
Figure 7:
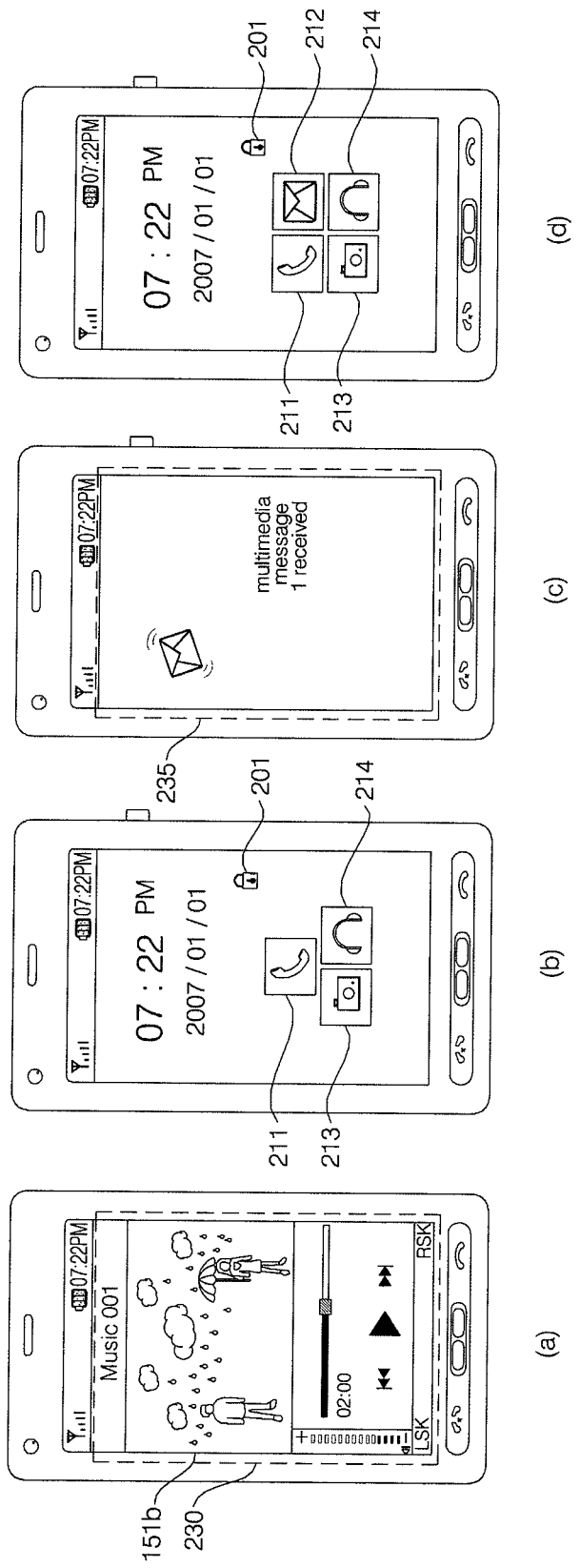

Next, FIGS. 5-7 are overviews of display screens illustrating features of the first embodiment described in FIG. 4. As shown in FIG. 5(*a*), the controller 180 touch-locks the entire display area 151*b* of the touch screen (e.g., after a predetermined amount of time with no activity on the terminal, etc.). The controller 180 also displays a lock icon 201 on the display area 151*b* to inform the user the mobile terminal has entered the touch-lock mode. Also, the controller 180 displays application execution icons 211~214. However, if the user touches one of the icons 211~214 in the touch-lock mode, the corresponding application is not executed (i.e., because the entire display area 151*b* of the touch screen is locked).

Further, in FIG. 5(a), the first application execution icon 211 is a phone icon for executing a phone call/phone receive application, and the second application execution icon 212 is mail or message icon for executing a message transmit/receive application. Further, the third application execution icon 213 is a camera icon for executing camera related applications such as picture taking, video recording or album viewing applications, and the fourth application execution icon 214 is music/video player icon for executing an MP3 player related application, for example.

In addition, FIG. 5(a) illustrates the controller 180 displaying four icons, but the user can change the number of application execution icons displayed on the display area 151b while the mobile terminal is in touch-lock mode. The user can also set what type of icons (e.g., mail, music, etc.) are to be displayed during the touch-lock mode. In addition, the user can also set the mobile terminal to automatically display the application execution icons on the display area 151b when the mobile terminal enters touch-lock mode, or not to automatically display the application execution icons on the display area 151b when the mobile terminal enters touch-lock mode.

Further, the controller 180 also detects whether the user manipulates or operates the second user input unit 130b. When the user does manipulate the user input unit 130b, the controller 180 detects this action as a 'touch lock release order' for the area where the application execution icons are displayed. That is, when the user selects the input unit 130b, the controller 180 unlocks an area of the touch screen that includes at least one displayed icon (e.g., icons 211~214 in FIG. 5(a)) such that a touching of the at least one icon displayed on the touch screen executes the corresponding function of the icon. However, the controller 180 maintains other areas of the touch screen in the touch-lock mode.

Also, the user may manipulate the input unit 130b by pressing the unit 130b a predetermined number of times, for a predetermined length of time (e.g., a long touch, a short touch, etc.). For example, if the user presses the second user input unit 130b twice in a rapid manner (e.g., a double touch), the controller 180 recognizes this action as a 'touch lock release order'. In this instance, the controller 180 performs an operation such as changing the color of the application execution icons 211~214, changing the color of an area on which the application execution icons 211~214 are displayed, etc. FIG. 5(b) illustrates the controller 180 highlighting an area 215 where the application icons 211~214 are displayed. The controller 180 also unlocks the icons 211~214 within the area 215 such that the user can touch one of the icons 211~214 to execute a corresponding application, even though the mobile terminal is in the touch-lock mode as evident by the displayed lock icon 201 in FIG. 5(b).

Thus, as shown in FIG. 5(b), the user can determine that the mobile terminal is in the touch-lock mode via the lock icon 201 and also determines that the icons 211~214 enclosed in the area 215 can still be selected to execute a corresponding application via the highlighted area 215. In more detail, FIG. 6(a) illustrates the user selecting the phone icon 211 to execute a phone application. As shown in FIG. 6(b), after the user selects the phone icon 211, the controller 180 executes a phone application and displays a phone call application screen 220 including a dial or key pad the user can manipulate to call another user. Thus, the user can execute certain applications even thought the mobile terminal is in the touch-lock mode. That is, only a portion of the touch screen is unlocked and other portions are kept in the locked mode.

In addition, as shown in FIG. 6(b), the controller 180 unlocks all of the area of the touch screen when the user selects any one icon. However, the controller 180 can also be set to unlock only a portion of the touch screen that is sufficient to display information regarding the execution of the corresponding application (e.g., the phone call screen 220 in FIG. 6(b)). Thus, the user can set the mobile terminal to remain in a touch-lock mode or to touch-unlock the entire area of the touch screen when the application corresponding to the application execution icons is executed.

Also, in another example, the controller 180 may selectively touch-unlock the entire area of the touch screen when the phone call application is executed, and not touch-unlock the entire area of the touch screen when the MP3 player application is executed. That is, the controller 180 may maintain the touch-lock mode of the mobile terminal or touch-lock release mode depending on the type of application being executed.

Next, FIG. 7 is an overview of display screens illustrating an application being executed on the mobile terminal, and the mobile terminal entering into the touch-lock mode after a predetermined amount of time. In more detail, as shown in FIG. 7(a), the mobile terminal is executing an MP3 music playing application and displaying a music playing screen 230 including information relevant to the music playing application. Then, as shown in FIG. 7(b), the controller 180 enters the mobile terminal into the touch-lock mode so as to lock the entire area of the touch screen 151b (e.g., after a predetermined amount of time with no touching of the touch screen 151b, etc.)

In addition, as shown in FIG. 7(b), the controller 180 also displays the lock icon 201 to inform the user the mobile terminal is in the touch-lock mode. Also, as discussed above with respect to FIGS. 6 and 7, the user can change the number and type of the application icons being displayed when the mobile terminal is in the touch-lock mode. In the example shown in FIG. 7(b), the controller 180 displays three application execution icons 211, 213, 214 on the display area 151b based on the user's setting (or based on a preset default setting).

In addition, in an alternative embodiment, the controller 180 can display the third icon 214 corresponding to the music playing application, even though the user has set the controller 180 to display only two icons (e.g., the icons 211 and 213). That is, the controller 180 displays the application execution icon 214 corresponding to the application which is currently being executed when the mobile terminals enter into the touch-lock mode, even though the user set the controller 180 to display only two application icons 211, 213 when the mobile terminal enters into the touch-lock mode. The controller 180 may also change the sharpness, color, shape or the brightness of the MP3 player related application execution icon 214 to distinctively display the mp3 player related application execution icon 214 from the other application execution icons 211, 213. Thus, the user can see that MP3 player related application was executing on the mobile terminal when the touch-lock mode was entered.

Also, as shown in FIG. 7(c), the controller 180 can also display a multimedia message receipt screen 235 on the display area 151b when a multimedia message receipt event occurs while the touch screen is locked. This informs the user that a new message is being received by the mobile terminal. The controller 180 also adds the multimedia message icon 212 to the icons 211, 213 and 214 as shown in FIG. 7(d). Thus, when a certain event occurs, the controller 180 displays an additional application execution icon on the display area corresponding to the certain event. For example, the application may be one of a received message check application, a received email check application, a Bluetooth communication application, or applications related to a connection between the mobile terminal and other external mobile terminals.

As discussed with respect to FIG. 5(a), the user may select the key 130b to perform the 'touch-lock release order' for the area where the application icons are displayed. Then, the controller 180 highlights the area where the application icons are displayed and the user can touch the application execution icon 212 to check the received message. In addition, in FIG. 5(a), the entire area 215 is highlighted when the user selects the key 130b. However, in an alternative embodiment, the controller 180 can toggle and highlight each displayed icon each time the user presses the key 130b. Thus, with reference to FIG. 7(d), the user can toggle between the icons 211, 212, 213 and 214 by consecutively pressing the key 130b. The controller 180 then highlights each corresponding icon such that the user can see the corresponding icon is highlighted and thus can be selected.

Figure 8:
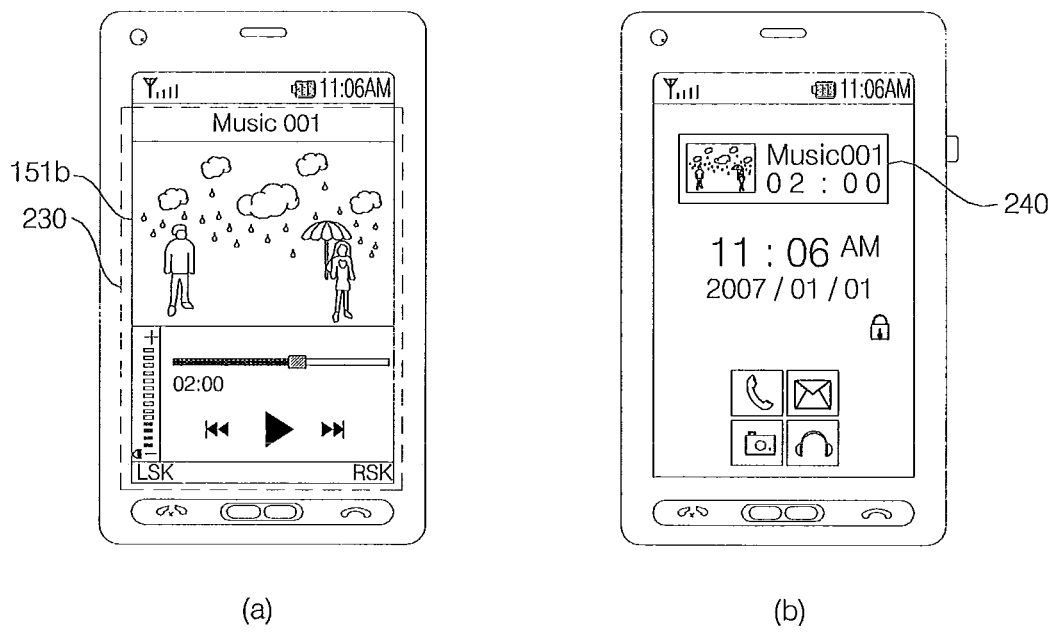

Next, FIG. 8 is an overview of display screens illustrating the mobile terminal entering into the touch-lock mode while an MP3 player related application is being executed. As shown in FIG. 8(a), the controller 180 displays an MP3 player application related screen 230 on the display area 151b, while the MP3 player application is being executed on the mobile terminal. Then, if no user input is detected for a predetermined amount of time, for example, the controller 180 touch-locks the touch screen as shown in FIG. 8(b). The controller 180 also displays the lock icon 201 to inform the user that the mobile terminal is in the touch-lock mode.

In addition, as shown in FIG. 8(b), the controller 180 also displays an icon-screen 240 on the display screen 151b related to the application currently being executed. Thus, the user can see the information related to the application currently being executed on the mobile terminal via the icon-screen 240. That is, as shown in FIG. 8(b), the icon-screen 240 for the MP3 player related application currently being executed includes information regarding the MP3 which is being played such as the title and playing time. The name of the singer, a link to download the music, etc. can also be displayed. Further, in the example shown in FIG. 8(b), the icon-screen 240 also includes a picture of the album jacket of the MP3 file being played.

In addition, the icon-screen 240 can also function as the other icons displayed (e.g., the icons 211-214 shown in FIG. 7(b)). Thus, in this instance, after the mobile terminal has entered the touch-locked mode, the user can select the key 130b to perform the 'touch-lock release order' for releasing the icons displayed as well as the icon-screen 240. The icon-screen 240 may also function as an application execution icon related to an MP3 player related application. That is, the user can touch the icon-screen 240 and check the MP3 player application related screen displayed on the display area.

Further, the types of icon-screen 240 the controller 180 may display on the touch-locked display area 151b are various and include information regarding stock market information, weather forecast information, navigation information, and schedule information. The user may also advantageously set the type of information included on the icon-screen displayed on the display area 151b.

Figure 9:
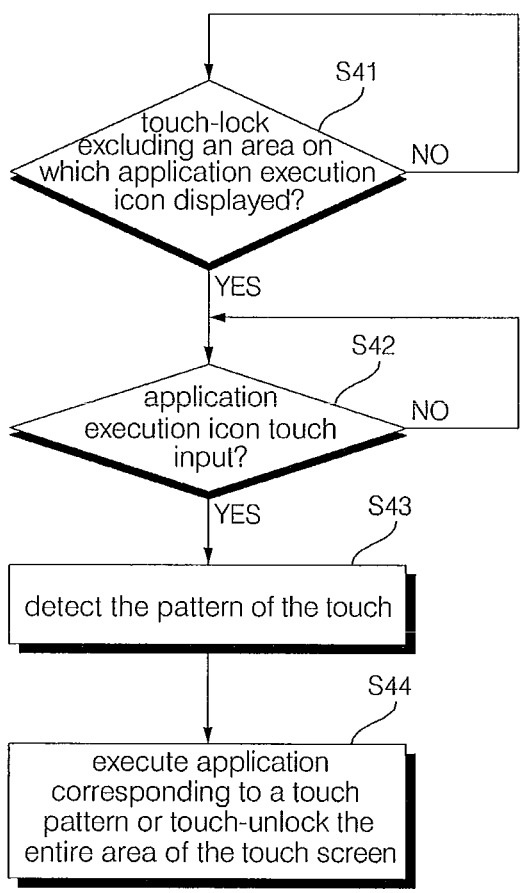
FIG. 9 is a flowchart illustrating a method of controlling a mobile terminal according to another embodiment of the present invention.

Next, FIG. 9 is a flowchart illustrating a method of controlling a mobile terminal according to second embodiment of the present invention. In this embodiment, the controller 180 locks the touch screen if the user has not performed an action on the terminal for a predetermined amount of time, has selected a predetermined key on the terminal to place the touch screen in the touch-lock mode, etc. as in the first embodiment, but does not lock an area of the touch screen that include an application execution icon or icons (S41).

The application execution icon (or icons) may be a touch-lock release icon, a call receive icon, a call transmit icon, a received message confirmation icon, etc. The controller 180 then determines if the user has selected or manipulated the displayed application execution icon (S42). Further, when the controller 180 determines the user has selected or manipulated the icon (Yes in S42), the controller 180 determines the pattern of the touch (S43). For example, the touch pattern can include the user performing a touch and drag operation (or a sliding operation), a double touch operation, a long touch operation where the user touches the icon for a period of time longer than a predetermined time period, a successive touch pattern where the user touches two icons simultaneously or within a predetermined time from each other, a number of times the user touches the icon, a strength of the touch, a moving/dragging direction or the speed of the touch, etc.

Figure 10:
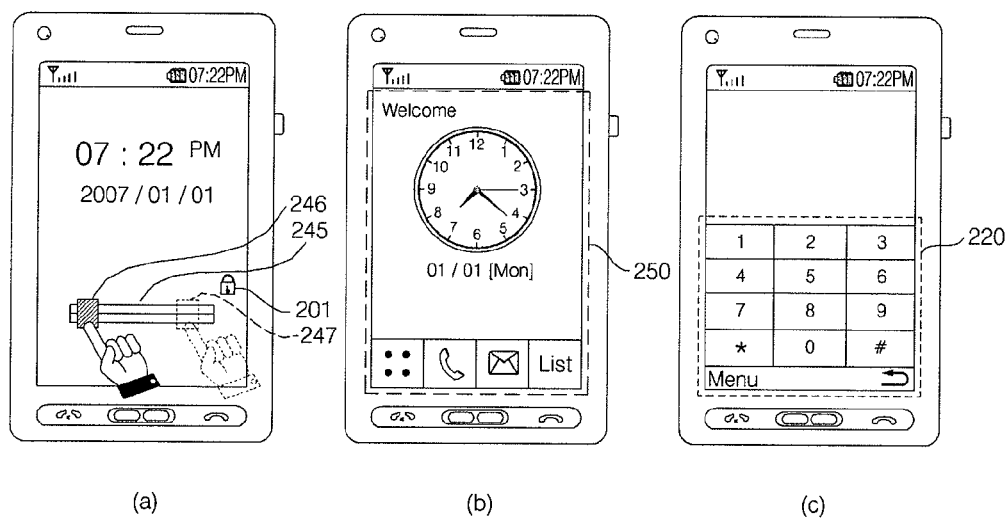
FIGS. 10 and 11 are overviews of display screens illustrating features related to the embodiment shown in FIG. 9.
Figure 11:
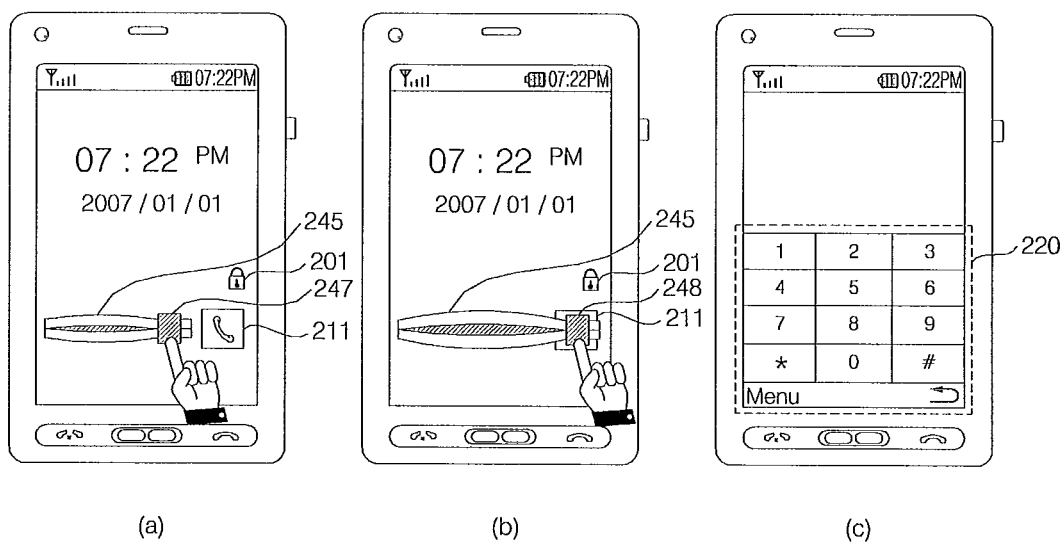

The controller 180 then executes an operation according to the determined touch pattern (S44). Therefore, in this embodiment, the controller 180 can execute different applications for a same icon based on different touch patterns. In more detail, FIGS. 10 and 11 are overviews of display screens illustrating a method of controlling the mobile terminal according to the second embodiment.

As shown in FIG. 10(a), the controller 180 displays a touch-lock release application execution icon 245 on the display screen when the mobile terminal enters the touch-lock mode. The controller 180 also touch-locks the display area of the touch screen, except the area on which the application icon 245 is displayed. In addition, similar to the other embodiments, the controller 180 also displays the lock icon 201 on the display area to inform the user that the mobile terminal is in the touch-lock mode.

Further, the controller 180 also detects whether the displayed application icon 245 is touched, and detects the particular pattern of the touch (e.g., a sliding touch, a long touch, a double touch, a flicking touch, etc.). Then, according to the detected touch pattern, the controller 180 executes an application corresponding to the touched application execution icon and the detected touch pattern. For instance, and as shown in FIG. 10(a), the user can drag the cursor or slide bar of the touch-lock release application execution icon 245 from position 246 to position 247. Then, the controller 180 executes a touch-lock release application corresponding to the touched application execution icon 245. Thus, the controller 180 unlocks the entire area of the touch screen and displays an idle or standby screen 250 on the display area as shown in FIG. 10(b).

However, in an alternative embodiment, the user can touch the touch-lock release application execution icon 245 for an amount of time longer than a preset time (e.g., a long touch), at which point the controller 180 executes a phone call application as shown in FIG. 10(c). That is, the controller 180 displays the phone call application screen 220 that the user can use to place a call to another party.

Further, the user can change the setting of the mobile terminal so that the controller 180 executes an application according to the detected touch pattern. For instance, and as described above, the user can set the mobile terminal to execute a phone call application if the touch-lock release application icon 245 is touched more than the predetermined amount of time, and to execute a received multimedia message check application if the touch-lock release application icon 245 is touched twice in a short amount of time (e.g., a double touch).

Next, FIG. 11 is an overview of display screens illustrating the controller 180 displaying at least two application execution icons when the mobile terminal enters into the touch-lock mode. In more detail, as shown in FIG. 11(a), the controller 180 displays the touch-lock release application execution icon 245 and the phone application icon 211 when the mobile terminal enters the touch-lock mode. The controller 180 also displays the lock icon 201 to inform the user the touch-lock mode has been entered.

Further, as shown in FIGS. 11(a) and 11(b), the user continuously touches and drags the cursor or sliding bar of the touch-lock release application execution icon 245 from the position 247 to an area on which the first application execution icon 211 is displayed. Also, as shown in FIG. 11(b), the shape of the touch-lock release application execution icon 245 is changed (e.g., the icon 245 is stretched into the icon 211). Then, as shown in FIG. 12(c), the controller 180 executes the phone call application and displays the phone call screen 220 related to the phone call application on the display area.

Thus, in FIG. 11, the user can easily see that the icon 247 has been dragged into the icon 211 informing the user that the controller 180 will execute the phone call application and display the screen 220. In addition, the controller 180 executes the application related to the first application execution icon 211 when the cursor or slide bar of the touch-lock release application execution icon 245 is dragged to the first application execution icon 211. However, the controller 180 may also execute the application related to the icon 211 when the cursor or slide bar of the icon 245 and the icon 211 is touched concurrently or touched within a predetermined time from each other.

The user may also set the method to input the execution order of an application related to the particularly displayed icon (e.g., the icon 211 in FIGS. 10 and 11) differently. Further, in FIGS. 10 and 11, the controller 180 may release the touch-lock mode of the touch screen according to the type of the application being executed. For instance, if the user touches the touch-lock release application execution icon 245 in a manner similar to its shape, the controller 180 releases the touch-lock mode. Also, if the user touches the icon 245 for more than a predetermined amount time, or more than a predetermined number of times within a set time period, the controller 180 releases the touch-lock mode. In addition, if the user drags the cursor or slide bar of the touch-lock release application execution icon 245 to the first application execution icon 211 or touches both of the icons 245 and 211 such that phone call application is executed the controller 180 can release the touch-lock mode of the touch screen.

However, if the user touches the touch-lock release application execution icon 245 in a manner that is different than a predetermined 'execution pattern', the controller 180 maintains the touch-lock mode. Also, if the music player execution icon 214 is displayed on the display area, and the user drags the cursor or slide bar of the touch-lock release application execution icon 245 to the music player execution icon 214, the controller 180 executes the MP3 player related application. However, in this example, the controller 180 does not have to unlock the touch-lock mode and can maintain the screen in the locked mode. In addition, the user may set the touch-lock mode to be released upon the application being executed.

In addition, the user can set the controller 180 to execute a phone call application if a portion of the touch-lock release icon 245 is touched for a predetermined amount of time. Also, if a portion of the touch-lock release icon is touched for a predetermined number of times, the controller 180 can be set to execute a message send application. Furthermore, the user can execute certain application while the mobile terminal is in a touch-lock mode by operating a key on the mobile terminal such as a side key. In more detail, the side key may be equipped on the mobile terminal to input orders or commands into the mobile terminal in a touch-lock mode. The side key may be the first, second, third, fourth and fifth user input unit 130a, 130b, 130c, 130d and 130e in FIGS. 2 and 3. The user can also use a key equipped on the front of the mobile terminal or a soft key rather than the side key to input orders or commands into the mobile terminal in the touch-lock mode.

Figure 12:
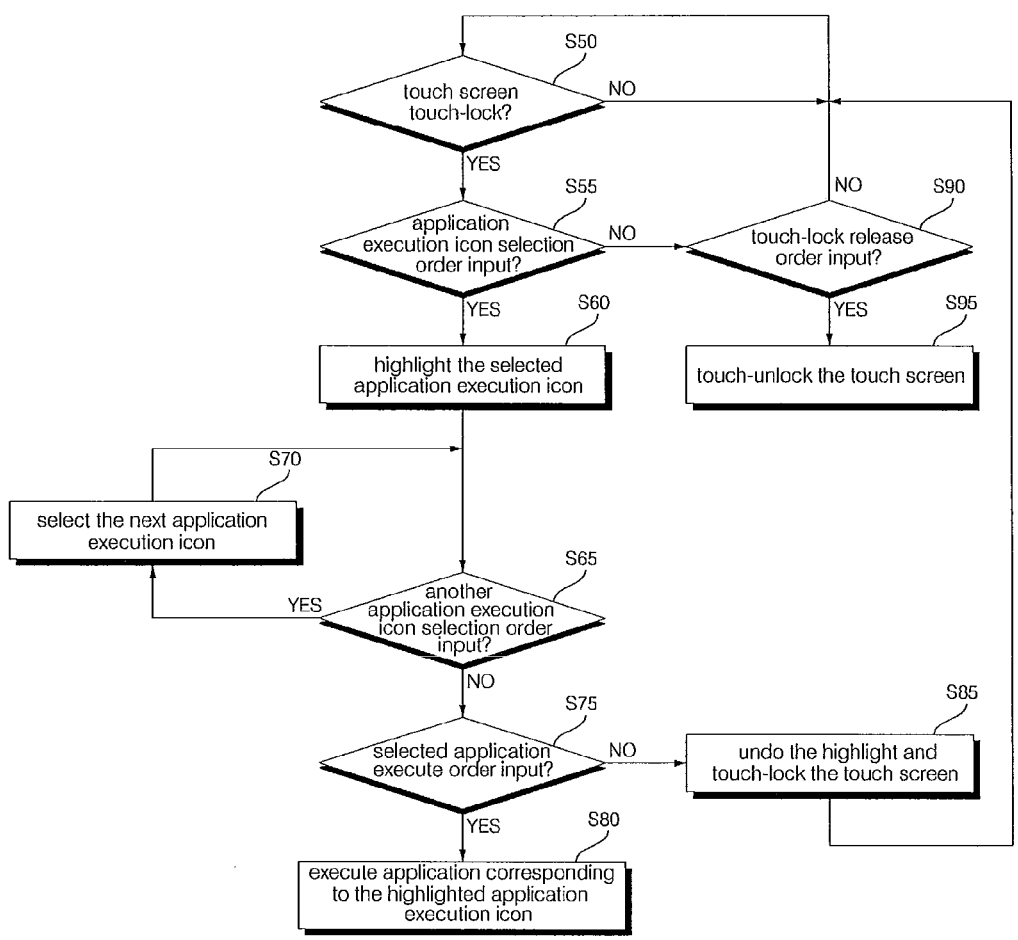
FIG. 12 is a flowchart illustrating a method of controlling a mobile terminal according to an embodiment of the present invention.

Next, FIG. 12 is a flowchart illustrating a method of controlling a mobile terminal according to an embodiment of the present invention. As shown, the controller 180 determines whether the touch screen is locked (S50). This is similar to step S10 in FIG. 4. Also, when the touch screen is locked (Yes in S50), the controller 180 determines if the user selects an icon selection order input on the mobile terminal (S55). For example, the icon selection order input can be selected when the user performs a particular operation on a button or key on the mobile terminal.

Figure 13:
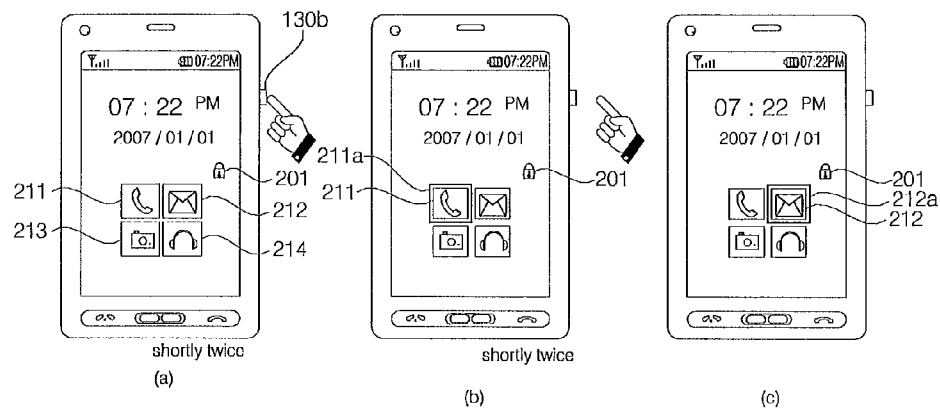
FIGS. 13-15 are overviews of display screens illustrating features related to the embodiment shown in FIG. 12.

In this embodiment, the controller 180 determines that the icon selection order input has been selected when the user selects the side key 130b twice in a successive manner (see also FIG. 13). The icon selection order input may also be selected when the user pushes the side key for a predetermined amount of time or presses the key for a predetermined number of times (e.g., twice, three times, etc.). The user can also advantageously set what operation on the key will invoke the icon selection order input.

When the controller 180 determines the user has selected the icon selection order input (Yes in S55), the controller 180 highlights a particular application execution icon included in icons displayed on the touched locked screen (S60). For example, the controller 180 can change or highlight the color of the application execution icon when the icon selection order input is selected.

Therefore, the user can see that an application execution icon is selected through the highlighted status of the application execution icon. Further, the controller 180 can highlight a particular icon by changing a sharpness, color, shape or brightness of the selected application execution icon or an area adjacent to or around the selected application execution icon. The controller 180 can also enlarge the size of the selected application execution icon or raise the contrast of the selected application execution icon. Thus, the user can readily see what application execution icon has been selected.

The controller 180 also determines the number of times the user has selected the icon selection order input (S65). For example, when the user continues to operate the side key in the predetermined input manner (e.g., using a double touch input method in a successive manner) (Yes in S65), the controller 180 selects a next application execution icon among the application execution icons displayed on the touch screen (S70). Thus, the user can toggle through the displayed application execution icons by successively manipulating the icon selection order input button.

Further, when an application execution icon is selected and highlighted, the controller 180 determines whether the user inputs an application execution order requesting the application corresponding to the highlighted icon be executed (S75). The user can input the application execution order by pressing or manipulating a key on the mobile terminal in a predetermined manner. For example, the user can push the side key for a predetermined amount of time (e.g., a long touch operation) or operate the side key for a predetermined number of times to input an application execution order to the mobile terminal. In this embodiment, the controller 180 determines the user has input an application execution order when the side key is pushed once for a predetermined amount of time. Thus, the same side key can be used for two different operations in this embodiment. That is, the user can press the key twice in a successive manner to toggle between different application execution icons and then press the key a single time for a predetermined amount of time to execute a highlighted application execution icon.

Thus, when the controller 180 determines the user has requested the application execution icon be executed (Yes in S75), the controller 180 executes an application corresponding to the selected application execution icon (S80). However, if the controller 180 determines the user has not requested the application execution icon be executed (e.g., the application execution order input has not been detected for a predetermined time) (No in S75), the controller 180 undoes the highlight of the selected icon or area around the icon and touch-locks the entire area of the touch screen (S85).

Figure 14:
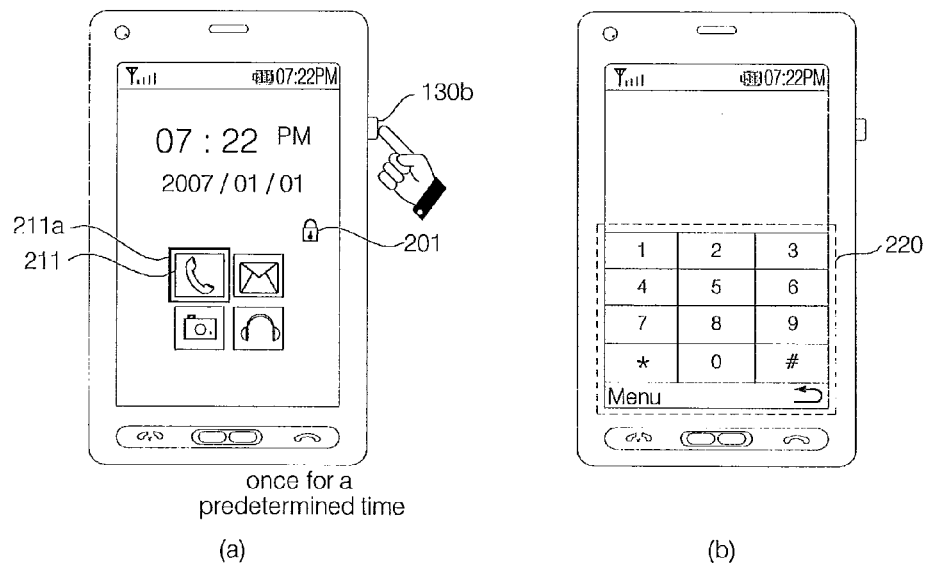
Figure 15:
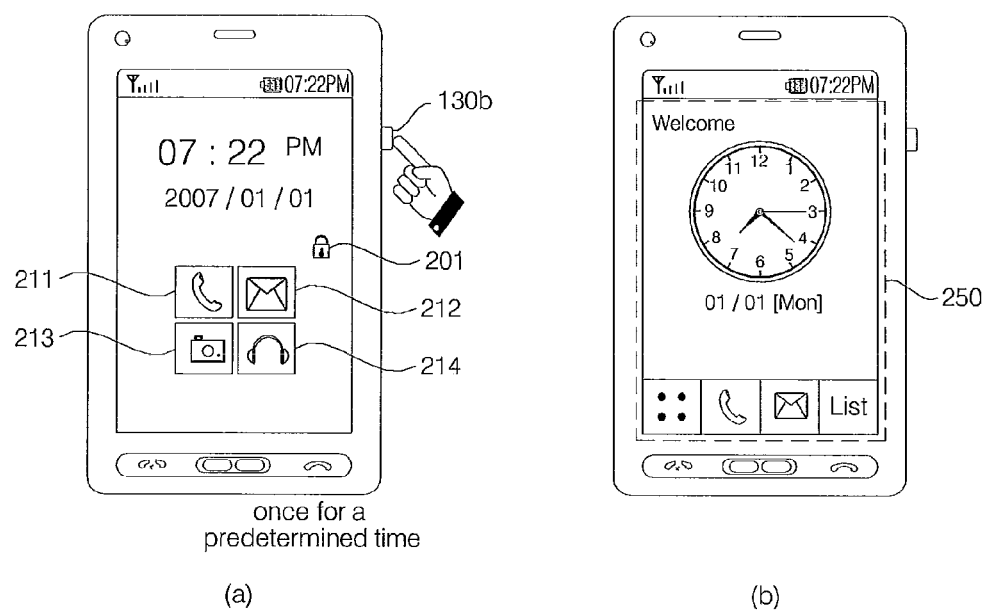

Also, when the entire area of the touch screen is touch-locked, the controller 180 detects whether a touch-lock release input for the entire area has been input (S90). If a touch-lock release input for the entire area has been input to the mobile terminal (Yes in S90), the controller 180 touch-unlocks the entire area of the touch screen (S95). The user may request the touch-lock of the touch screen be released by manipulating a key on a mobile terminal or order key displayed on the touch screen, Next, FIGS. 13-15 are overviews of display screens illustrating the third embodiment of the present invention. As shown in FIG. 13(*a*), the controller 180 displays the application execution icons 211~214 on the display area 151*b* when the touch screen is placed into the touch-locked mode. The controller 180 also displays the lock icon 201. In this embodiment, the controller 180 toggles between and highlights different application execution icons based on a selection of the key 130*b*. In more detail, FIG. 13(*a*) illustrates the user selecting the key 130*b* twice in a rapid manner (e.g., a double touch). In this instance, and as shown in FIG. 13(*b*), the controller 180 highlights the first icon 211 (the phone icon) or the area 211*a* near or surrounding the first icon 211.

Then, in FIG. 13(*b*), the user again performs the double touch action on the key 130*b*, and as shown in FIG. 13(*c*), the controller 180 highlights the second icon 212 or the area 212*a* around the second icon 212 (the second icon 212 is the message icon in this example). Thus, the controller 180 selects an application execution icon among the application execution icons 211~214 based on an input method corresponding to the key 130*b*. The inputting method shown in FIG. 13 corresponds to the double touch operation, but other types of input operations are also possible such as the pushing the side key 130*b* for a predetermined time, operating the side key more than a predetermined number of times within a set time limit, etc. Thus, in this embodiment, the user may continuously input the application execution selection order input to the mobile terminal and select one of the application execution icon among the application icons displayed on the display area 151*b*.

Next, FIG. 14 is an overview of display screens illustrating an alternative method of highlighting an application execution icon and executing a corresponding application. In more detail, the icon 211 or the area 211*a* around the icon 211 is highlighted (e.g., via the method shown in FIG. 13). Then, the controller 180 detects the input of the application execution order of the selected application execution icon 211.

In this example, and as shown in FIG. 14(*a*), the application execution order is the user pressing the side key 130*b* once for more that a predetermined time (e.g., a long touch operation). Then, as shown in FIG. 14(*b*), the controller 180 executes the phone application corresponding to the icon 211 and displays the phone application screen 220. Further, the application execution order may also be the user pressing the side key 130*b* more than the predetermined number of times within the set time limit.

In addition, as discussed above with respect to some of the other embodiments, the controller 180 may release the entire screen from the touch-lock mode or only part of the screen related to the executed application. The user may also set the mobile terminal to remain in the touch-lock mode, or release the touch-lock mode when the application corresponding to the selected application execution icon is executed upon the detection of the application execution order. Also, the controller 180 may be set to release the touch-lock mode when the phone call application is executed, and maintain the touch-lock mode when the MP3 player related application is executed. That is, the controller 180 can maintain or release the touch-lock mode according to the type of the application.

Next, FIG. 15 is an overview of display screens illustrating the controller 180 releasing the entire touch screen from the touch-lock mode. That is, as shown in FIG. 15(*a*), the user pushes the second user input unit 130*b* for more than a predetermined time while no application execution icon is selected. Then, as shown in FIG. 15(*b*), the controller 180 detects the input corresponding to the touch-lock release order for the entire area on the touch screen, and releases the entire area of the touch screen from touch-lock. In this example, the controller 180 displays an idle screen 250 in the display area 151*b*. However, if an application was being executed when the touch-lock is released, the controller 180 can display a screen related to the application being executed.

Also, in the second and third embodiments, the number and type of the application execution icons may be changed, and additional application execution icons may be displayed on the display area when certain event occurs after the mobile terminal enter into touch-lock mode, as shown in FIG. 7. Also, in the second and third embodiments, the icon-screen including information regarding the application being executed currently on the mobile terminal can be displayed on the display area after the mobile terminal enters into touch-lock mode as shown in FIG. 8.

That is, the mobile terminal and corresponding method of controlling the mobile terminal according to embodiments of the present invention are not restricted to the embodiments set forth herein. Variations and combinations of the embodiments are within the scope of the present invention. Portions of one embodiment may also be combined with portions of another embodiment.

Thus, the present invention provides several advantages. For example, a user can execute certain applications even though the touch screen is touch-locked. Therefore, the user does not have to first release the touch-lock mode before executing particular application. The partial touch-lock mode according to embodiments of the present invention also save battery power because only a portion of the screen is unlocked.

Further, embodiments of the present invention can be realized as computer-readable code written on a computer-readable recording medium included in a mobile terminal such as a mobile station modem (MSM). The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and data transmission through the Internet.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
   displaying, via a controller, a lock screen on a touch screen of the mobile terminal indicating the mobile terminal is locked;
   displaying, via the controller, an unlock image on the lock screen for unlocking the locked mobile terminal;
   receiving a selection signal indicating a selection of a camera icon displayed on the lock screen;
   entering a camera mode on the mobile terminal based on the received selection signal; and
   displaying a non-locked camera display screen allowing operation of the camera mode.

2. The method of claim 1, further comprising:
   receiving, via the controller, a pressing signal corresponding to a pressing of a button on the mobile terminal; and
   displaying a music playing icon for controlling an audio function on the mobile terminal based on the received pressing signal.

3. The method of claim 2, wherein the audio function is executed in a background state while the mobile terminal is locked.

4. The method of claim 2, wherein the pressing signal is a double pressing signal indicating a double pressing of the button.

5. The method of claim 1, further comprising:
   receiving an incoming event signal indicating an incoming event has occurred on the locked mobile terminal;
   displaying a new icon indicating a type of the incoming event on the lock screen;
   receiving a touching action selection signal indicating a selection of the displayed new icon; and
   displaying contents related to the incoming event based on the received touching action selection signal.

6. The method of claim 1, further comprising:
   displaying a preview image on the non-locked camera display screen.

7. A mobile terminal, comprising:
   a wireless communication unit configured to wireless communicate with at least one other terminal;
   a display unit;
   a controller configured:
   display a lock screen on a touch screen of the display unit indicating the mobile terminal is locked,
   display an unlock image on the lock screen for unlocking the locked mobile terminal, receive a selection signal indicating a selection of a camera icon displayed on the lock screen,
   enter a camera mode on the mobile terminal based on the received selection signal, and
   display a non-locked camera display screen allowing operation of the camera mode.

8. The mobile terminal of claim 7, wherein the controller is further configured to:
   receive a pressing signal corresponding to a pressing of a button on the mobile terminal, and
   display a music playing icon for controlling an audio function on the mobile terminal based on the received pressing signal.

9. The mobile terminal of claim 8, wherein the controller is further configured to execute the audio function in a background state while the mobile terminal is locked.

10. The mobile terminal of claim 8, wherein the pressing signal is a double pressing signal indicating a double pressing of the button.

11. The mobile terminal of claim 7, wherein the controller is further configured to receive an incoming event signal indicating an incoming event has occurred on the locked mobile terminal, to control the display unit to display a new icon indicating a type of the incoming event on the lock screen, to receive a touching action selection signal indicating a selection of the displayed new icon, and to display contents related to the incoming event based on the received touching action selection signal.

12. The mobile terminal of claim 7, wherein the controller is further configured to display a preview image on the non-locked camera display screen.

* * * * *